United States Patent
DeCato et al.

(10) Patent No.: US 11,118,029 B2
(45) Date of Patent: Sep. 14, 2021

(54) HEAT CURABLE ELASTOMER COMPOSITIONS

(71) Applicant: Henkel IP & Holding GmbH, Duesseldorf (DE)

(72) Inventors: Alfred A. DeCato, Highland, MI (US); Shuhua Jin, Cheshire, CT (US)

(73) Assignee: Henkel IP & Holding GmbH, Duesseldorf (DE)

( * ) Notice: Subject to any disclaimer, the term of this patent is extended or adjusted under 35 U.S.C. 154(b) by 385 days.

(21) Appl. No.: 16/034,406

(22) Filed: Jul. 13, 2018

(65) Prior Publication Data

US 2018/0319956 A1 Nov. 8, 2018

Related U.S. Application Data

(63) Continuation of application No. PCT/US2017/013407, filed on Jan. 13, 2017.

(60) Provisional application No. 62/279,280, filed on Jan. 15, 2016.

(51) Int. Cl.
| | |
|---|---|
| *C08K 9/06* | (2006.01) |
| *C08F 110/10* | (2006.01) |
| *C08L 23/22* | (2006.01) |
| *C09C 1/30* | (2006.01) |
| *C08K 3/36* | (2006.01) |
| *C08K 5/5419* | (2006.01) |
| *C08K 5/5425* | (2006.01) |

(52) U.S. Cl.
CPC .............. *C08K 9/06* (2013.01); *C08F 110/10* (2013.01); *C08L 23/22* (2013.01); *C09C 1/3081* (2013.01); *C08F 2810/20* (2013.01); *C08K 3/36* (2013.01); *C08K 5/5419* (2013.01); *C08K 5/5425* (2013.01)

(58) Field of Classification Search
CPC .......... C08K 9/06; C08K 3/36; C08K 5/5419; C08K 5/5425; C08F 110/10; C08F 2810/20; C08L 23/22; C09C 1/3081
USPC ........................................................ 524/264
See application file for complete search history.

(56) References Cited

U.S. PATENT DOCUMENTS

| | | | |
|---|---|---|---|
| 3,159,601 A | 12/1964 | Ashby | |
| 3,159,662 A | 12/1964 | Ashby | |
| 3,220,972 A | 11/1965 | Lamoreaux | |
| 3,516,946 A | 6/1970 | Modic | |
| 3,814,730 A | 6/1974 | Karstedt | |
| 5,952,419 A | 9/1999 | DeGroot, Jr. et al. | |
| 6,451,468 B1 | 9/2002 | Adachi | |
| 6,875,534 B2 | 4/2005 | Nakamura et al. | |
| 7,012,107 B2 | 3/2006 | Harvey et al. | |
| 7,714,053 B2 * | 5/2010 | Adler ........................ | B60C 1/00 524/430 |
| 8,038,832 B2 | 10/2011 | Tanaka et al. | |
| 8,066,288 B2 | 11/2011 | Burdzy et al. | |
| 8,197,990 B2 | 6/2012 | Burdzy et al. | |
| 8,349,940 B2 | 1/2013 | Hahn et al. | |
| 2003/0160207 A1 | 8/2003 | Sakaguchi | |
| 2011/0245371 A1 | 10/2011 | Schweitzer et al. | |
| 2014/0102332 A1 * | 4/2014 | Yoo ..................... | C08G 77/045 106/417 |

FOREIGN PATENT DOCUMENTS

| | | |
|---|---|---|
| CN | 105001538 A | 10/2015 |
| CN | 105075395 A | 11/2015 |
| EP | 1743928 A1 | 1/2007 |
| JP | 2003504474 A | 2/2003 |
| JP | 2007284482 A | 11/2007 |
| JP | 2011225877 A | 11/2011 |
| JP | 2012012576 A | 1/2012 |
| WO | 00/52073 A1 | 9/2000 |

OTHER PUBLICATIONS

International Search Report for International PCT Patent Application No. PCT/US2017/013407 dated Jun. 1, 2017.

* cited by examiner

*Primary Examiner* — Ling Siu Choi
*Assistant Examiner* — Ronald Grinsted
(74) *Attorney, Agent, or Firm* — James E. Piotrowski

(57) ABSTRACT

Disclosed is modified silica filler material wherein the silica filler material has been surface treated with both an alkyl silane and an alkenyl silane. The modified silica filler material, when included in an elastomeric composition, results in lower compression set and improved mechanical properties including viscosity, tensile strength, modulus and elongation. The filler material can be used at high levels in elastomeric compositions and does not raise the viscosity to unusable levels. The elastomeric composition including the modified filler material finds special use in the formation of gaskets for fuel cells.

20 Claims, No Drawings

HEAT CURABLE ELASTOMER COMPOSITIONS

RELATED APPLICATIONS

NONE.

STATEMENT REGARDING FEDERALLY SPONSORED RESEARCH

NONE.

TECHNICAL FIELD

This disclosure relates generally to heat curable elastomeric compositions, and more particularly to elastomeric compositions containing a silane modified silica filler material to provide superior physical and mechanical properties to the elastomer composition.

BACKGROUND OF THE INVENTION

Elastomeric compositions are those exhibiting viscoelastic properties and they are typically thermosetting compositions, although, some can be thermoplastic. The term rubber has often been used, to designate compositions having elastic properties that are derived from natural rubber harvested from rubber trees while elastomer has been used for synthetic rubber type compositions. In the present specification and claims the terms elastomer and robber are used, inter changeably. Elastomeric compositions often contain at least one elastomeric or rubber polymer, a filler material, and a crosslinking component. Elastomeric compositions are often used as sealing material, gasket material, adhesives and for the making of molded flexible parts.

Elastomeric compositions exhibit viscoelasticity, meaning they have both viscosity and elasticity, and very weak inter-molecular forces, generally having low Young's modulus and high failure, strain compared with other materials. Elastomeric polymers are amorphous polymers existing above their glass transition temperature, so that considerable segmental motion is possible. At ambient temperatures, elastomers are thus relatively soft and deformable. The long polymer chains of the elastomer are crosslinked during curing, which can include vulcanizing. The elasticity is derived from the ability of the long polymeric chains to reconfigure themselves to distribute an applied stress. The covalent crosslinkages bet ween polymer chains ensure that the elastomer will return to its original configuration when the stress is removed. As a result of this extreme flexibility, elastomers can be repeatedly extended at least 200% from their initial size without permanent deformation, depending on the specific material Without the crosslinkages or with short, uneasily reconfigured chains, the applied stress would result in a permanent, deformation. As discussed elastomeric compositions find special use in sealable compositions and components such as gasket materials. They are used in all sorts of gaskets including in fuel cells, engine component sealing, water tight seals and other sealing applications.

Silicone based rubbers, composed of a backbone of silicon, oxygen, carbon and hydrogen, have good elastomeric properties such as compression set and mechanical properties; however they tend to have very high moisture and gas permeability which is not desired in the present disclosure. Polyisobutylene, a polyolefin hydrocarbon, is a synthetic form of rubber which has the desired advantage that in addition to good mechanical properties it is moisture and gas impermeable. Being gas and moisture impermeable in addition to good mechanical properties is highly desirable for elastomer compositions according to the present disclosure.

As discussed herein the properties desired in elastomeric compositions used for sealing applications are: low compression set, high tensile strength, high modulus values, high elongation, relatively low viscosity and low permeability to moisture and gas. Problems with prior elastomers have included high compression set, low tensile strength, low modulus, low elongation, high viscosity and high moisture and gas permeability. Prior attempts to improve the properties of elastomers have include adding alkenyl containing monomers such as trivinylcyclohexane to improve the elastomer properties; however the resulting elastomers generally do not have a tensile strength above 145 psi and the elongation is less than 150%, Other prior attempts have included addition of silica filler material treated with a hydrophobic silicon compound such as hexamethyldisilazane (HMDZ). It, HMDZ, is a derivative of ammonia with trimethylsilyl groups in place of two hydrogen atoms on the nitrogen. These modified silica fillers are used with hydrosilylation crosslinkable agents such as: 1, 2 polybutadiene; 1, 6 hexanediol diacrylate; trimethylpropane triacrylate; and triallyl isocyanurate. These crosslinkers in combination with the modified silica can improve the elastomer's properties somewhat; however, the compression set of most formulations is still above 20% even with these modifications. The compression set of a material is the permanent deformation remaining after an applied force is removed. The term is normally applied to soft materials such as elastomers and it is a measure of the elastomer's sealing ability. The lower the compression set the less deformation and thus the better the sealing behavior. In addition, the produced elastomeric compositions usually cannot accommodate enough filler to improve the mechanical properties without raising the formulation viscosity too high to be useful.

It is desirable to provide art elastomeric composition that results in low compression set, high tensile strength, high modulus, high elongation, relatively low viscosity, and low moisture and gas permeability.

SUMMARY OF THE INVENTION

In general terms, this disclosure provides a heat curable elastomer composition that includes a specifically modified silica filler material that significantly improves the properties of the elastomeric composition. The improved properties include low compression set, high tensile strength, high modulus, high elongation, relatively low viscosity, high moisture barrier properties and high gas impermeability. The elastomeric products produced from the elastomeric composition can be used as a sealant or a gasket material, for example in fuel cells.

In one embodiment the present disclosure is a heat curable elastomeric composition comprising: a) a modified silica filler comprising silica that has been modified by treatment with at least one alkyl silane having a $C_1$ to $C_{30}$ alkyl group and at least one alkenyl silane having a $C_2$ to $C_{30}$ alkenyl group to form the modified silica filler; b) an elastomeric hydrocarbon polymer having a polyolefin backbone and functional alkenyl groups; c) a silicon-hydride crosslinker having at least two SiH functional groups; d) a hydrosilylation catalyst; and e) optionally, one or more of a stabilizer, an anti-oxidant, a plasticizer, an additional filler material, a handling improver, or a hydrosilylation catalyst inhibitor.

In another embodiment the present disclosure is a heat cured elastomer comprising: a) a modified silica filler comprising silica that has been modified by treatment with at least one alkyl silane having a $C_1$ to $C_{30}$ alkyl group and at least one alkenyl silane having a $C_2$ to $C_{30}$ alkenyl group to form the modified silica filler; b) an elastomeric hydrocarbon polymer having a polyolefin backbone and functional alkenyl groups; c) a silicon-hydride crosslinker having at least two SiH functional groups; d) a hydrosilylation catalyst; and e) optionally, one or more of a stabilizer, an anti-oxidant, a plasticizer, additional filter material, a handling improver, or a hydrosilylation catalyst inhibitor.

In another embodiment the present disclosure is a modified silica filler material comprising a silica filler material that has been modified by treatment, with at least one alkyl silane having a $C_1$ to $C_{30}$ alkyl group and at least one alkenyl silane having a $C_2$ to $C_{30}$ alkenyl group, wherein a weight ratio of the alkyl silane to the alkenyl silane is from (1 to 1.0):1.

These and other features and advantages of this disclosure will become more apparent to those skilled in the art from the detailed description of a preferred embodiment. The drawings that accompany the detailed description are described below.

BRIEF DESCRIPTION OF THE DRAWINGS

NONE.

DETAILED DESCRIPTION OF A PREFERRED EMBODIMENT

The present disclosure is directed toward a modified silica filler material and its use in heat curable elastomer compositions that are used as sealing materials or gaskets, especially for fuel cells. The compositions comprise: (A) a silica filler material treated with two or more silanes, wherein the two or more silanes include at least an alkyl silane and an alkenyl silane: in specific weight ratios relative to each other; (B) an elastomeric hydrocarbon polymer having a polyolefin backbone and containing functional alkenyl groups; (C) a silicon-hydride crosslinker with at least two SiH functional groups; and (D) a hydrosilylation catalyst.

The composition can either be a one component or a two component system. In a one component system all of the components of the formula are in a single formula. In a two component system the first component comprises a silicon-hydride crosslinker with at least two SiH functional groups and the second component comprises the hydrosilylation catalyst. The two parts are stored separately and only mixed shortly before the mixed composition will be used.

The following definitions apply in the present specification and claims unless noted otherwise. The term a hydrocarbon polymer having a polyolefin backbone and containing functional alkenyl groups means the following. The hydrocarbon polymer having a polyolefin backbone is a hydrocarbon polymer having a backbone that is formed from polymerization of olefin monomers. Olefin monomers are alkenes, meaning they have at least one carbon to carbon double bond in their structure. Some of these olefin monomers include by way of example but not limitation: ethylene, propylene, all the isomers of butylene, all the isomers of pentylene, methylpentene, isoprene, and mixtures thereof. The suitable olefin monomers comprise those of $C_2$ to $C_{30}$ with at least 1 C=C double bond. The polymers according to the present disclosure contain functional alkenyl groups meaning the polymer has alkenyl groups that can function in hydrosilylation reactions. The term alkenyl group means a group having at least one carbon to carbon double bond.

Preferably the polymer has terminal alkenyl groups. These terminal alkenyl groups can take several forms including an endo form, an exo form or an allyl form. The endo form has the following structure (—CH=C(CH$_3$)$_2$) while the exo form has the following structure (—CH$_2$—C(CH$_3$)=CH$_2$). The allyl form has the structure (—CH$_2$—CH=CH$_2$). There are numerous commercial sources for such hydrocarbon polymers having a polyolefin backbone and containing functional alkenyl groups as described herein. A polyisobutylene, abbreviated as "PIB", refers to a homopolymer of isobutylene units and is one example of a hydrocarbon polymer having a polyolefin backbone according to the present disclosure. Butyl rubber is a copolymer of isobuytylene and isoprene monomers, as understood by those of skill in the art, typically these copolymers include from 90 to 99.2 mole % isobutylene and 10 to 0.8 mole % isoprene. Butyl rubber is another example of a hydrocarbon polymer having a polyolefin backbone according to the present disclosure. An alkyl group means a substituent group derived from an alkane by removal of a single H group, meaning that it is a fully saturated hydrocarbon group. The simplest alkyl group is (—CH$_3$). An alkenyl group means, a substituent group derived from an alkene, meaning that it is a hydrocarbon with at least one unsaturated carbon to carbon double bond. The simplest alkenyl group is (—CH=CH$_2$). The alkenyl group can also have the carbon to carbon double bond located internally as in the structure (—CH=CH—). The term silica filler means a silicon dioxide based filler, meaning the majority component by weight of the filler is $SO_2$. A preferred silica filler is formed from fumed silica as known to those of skill in the art. The term silane refers to a structure containing a silicon atom having 4 substituent groups attached to it, Si(R)$_4$, wherein the silicon atom is fully saturated. The simplest silane is wherein the R groups are all hydrogen, Si(H)$_4$. The term an alkyl silane means a silane wherein at least one of the four R substituent groups is an alkyl group. The term alkenyl silane means a silane wherein at least one of the four R substituent groups is an alkenyl group. A silicon-hydride crosslinker means a structure having at least, two SiH functional groups that can participate in hydrosilylation reactions to crosslink polymer chains in the elastomeric composition. In a hydrosilylation reaction the SiH group is added across an unsaturated bond to form a covalent linkage to the Si group. When hydrosilylation is performed on an alkene the result is an alkyl silane while reaction with an alkyne produces a vinyl silane. A hydrosilylation catalyst means a catalyst that catalyzes the hydrosilylation reaction. The hydrosilylation reaction is used to crosslink the polymer chains containing alkenyl functional groups with the silicon-hydride crosslinker in the elastomeric compositions according to the present disclosure. The following standard abbreviations are used: m for meter, g for gram, L for liter, mg for milligram, ml for milliliter, and mmols for millimoles. Unless otherwise noted the term weight % means weight as a percentage of the total weight of the identified composition.

The present disclosure provides an elastomeric composition that finds special use as a sealing material and especially in the formation of elastomeric gaskets, such as those used in electronics, powertrains and many other automotive applications. These elastomeric gaskets are especially useful in fuel cell sealing applications. Fuel cells require many thin gaskets to allow for formation of the large stacks of sealed cells required for efficient utilization. Desirable properties for fuel cell gaskets are: a low compression set; low viscosity; high values for tensile strength, modulus and elongation; and low permeability to gas and moisture as described herein.

Preferably the heat curable elastomer composition according to the present disclosure comprises the following components: (A) a silica filler that has been modified by treatment with at least two silanes, one of the silanes being an alkyl silane and another of the silanes being an alkenyl silane; (B) a polymeric component comprising a hydrocarbon polymer having a polyolefin backbone and Containing functional alkenyl groups; (C) a silicon-hydride crosslinker containing at least two SiH functional groups; and (D) a hydrosilylation catalyst. Additional optional components can include: antioxidants and stabilizing agents, plasticizing agents, alkenyl functional monomers to improve handling, hydrosilylation catalyst inhibitors to prevent room temperature curing, and other filler materials such as alumina and/or carbon black.

Suitable base silica fillets, meaning the silica filler that is to be modified according to the present disclosure, can comprise any of a variety of silicone dioxide ($SiO_2$) products such as fumed silica products, preferably having a particle size sufficient to provide a specific surface area (BET) of at least 35 $m^2/g$. Preferably the fumed silica has not been pre-treated or modified in any way otter than according to the present disclosure. Fumed silica can be purchased from, a wide variety of sources including Evonik under the Aerosil® brand such as Aerosil® OX-50 which is filmed silica having a specific surface area (BET) of 35-65 $m^2/g$ or Aerosil® 200 which is filmed silica having a specific surface area (BET) of 175-225 $m^2/g$.

Suitable silanes for making the modified, silica filler according to the present disclosure comprise at least one alkyl silane and at least one alkenyl silane. An alkyl silane means a silane that includes at least one alkyl group attached to the Si atom. Examples of suitable alkyl silanes for the present disclosure include; those wherein the size of the alkyl group is from $C_1$ to $C_{30}$. Examples of preferred alkyl silanes include hexyltrimethoxysilane, n-octyltrimethoxysilane, hexadecyltrimethoxylsilane, and octadecyl triemthoxysilane. An alkenyl functional silane means a silane that includes as at least one of its R substituent groups an alkenyl group. Examples of suitable alkenyl functionalized silanes with a single alkenyl group include allyltrimethoxysilane, butenyltriethoxysilane, 7-octenyltrimethoxysilane, 10-undecenyltrimethoxysilane, and docosenylltriethoxysilane.

The silica filler can either be pre-treated with the silane modifiers according to the present disclosure or the silica filler can be treated in situ with the alkyl and alkenyl silanes during formation of the elastomeric composition. The modified silica filler is more compatible with the olefin backbone polymer and it can be covalently bound to the olefinic polymer. Addition of the modified silica filler to the elastomeric composition improves the compression set by lowering it. The addition of the modified silica filler improves the mechanical properties by raising the tensile strength, modulus, and elongation. Addition of the modified silica filler to the elastomeric composition does not raise the viscosity to high levels. Preferably the modification is done using a weight ratio of 1 to 10 of the alkyl silanes to 1 of the alkenyl silanes, more preferably from 2 to 5 of the alkyl silanes to 1 of the alkenyl silanes. Preferably the total amount of silane used to modify the silica filler is in the range of from 1 to 15 weight % based on the total weight of the modified silica filler, more preferably from 2 to 10 weight % based on the total weight of the modified silica filler. The modified silica filler is preferably used in the elastomeric composition at a level of from 10 to 40 weight %, more preferably at a level of from 15 to 30 weight % based on the total weight of the elastomeric composition. The modified silica filler can be used at much higher levels than previous fillers without increasing the elastomeric composition viscosity to the level where it becomes unusable. The modified silica filler reduces the compression set of the elastomeric composition while raising the tensile strength, modulus and elongation values.

The polymeric component comprising a hydrocarbon polymer having a polyolefin backbone and containing functional alkenyl groups according to the present disclosure means the polymer backbone is formed by polymerization of olefin monomers as described herein. Suitable monomers include, by way of example but not limitation: ethylene, propylene, all the isomers of butylene, all the isomers of pentylene, methylpentene, isoprene, and mixtures thereof. The suitable olefin monomers comprise those of $C_2$ to $C_{30}$ with at least 1 C=C double bond in the monomer. The polymers additionally include functional alkenyl groups meaning the polymer has alkenyl groups that can function in hydrosilylation reactions. The term alkenyl group means a group having at least one carbon to carbon double bond. Preferably the polymer has terminal alkenyl groups. These terminal alkenyl groups can take several forms including an endo form, an exo form or an allyl form. The endo form has the following structure (—CH=C(CH$_3$)$_2$) while the exo form has the following structure (—CH$_2$—C(CH$_3$)=CH$_2$). The allyl form has the structure (—CH$_2$—CH=CH$_2$). There are numerous commercial sources for such hydrocarbon polymers having a polyolefin backbone and containing functional alkenyl groups as described herein. Preferably the hydrocarbon polymer having a polyolefin backbone and containing functional alkenyl groups according to the present disclosure has a number average molecular weight of from 2,000 to 50,000, and more preferably from 5,000 to 20,000. Suitable examples include the diallyl terminated, polyisobutylenes available from Kaneka of Osaka Japan such as, by way of example and not limitation: EP200A having a molecular weight of approximately 5,000; EP400A having a molecular weight of about 10,000; and EP600A having a molecular weight of approximately 20,000. Other examples of suitable polymers according to the present disclosure include polyisobutylenes having endo and exo terminal alkenyl groups such as the Glissopal® PIBs from BASF, that include terminal carbon to carbon double bond functional groups at one or both terminal ends. Preferably the polymer according to the present disclosure is used in the range of from 30 to 70 weight %, more preferably from 40 to 60 weight % based on the total weight of the elastomeric composition.

The elastomeric composition further comprises a silicon-hydride cross-linker having at least two SiH functional groups that can participate in hydrosilylation reactions to crosslink the polymer chains in the elastomeric composition. Such silicon-hydride crosslinkers are well known to those of skill in the art, one suitable example being poly(dimethylsiloxane-co-methylhydrosilane). Preferably the silicon-hydride crosslinker has been modified with a long chain alkene to make it more compatible with the polymer having the olefin backbone. On example is CR300, a polyakyl hydrogen silicone. Suitable examples of modifiers are long chain alkenes like 1-dodecene, 1-tetradecene, and olefins like Linealene dimer A-20 ($C_{20}H_{40}$). The silane cross-linker molecular structure is not limited and can be linear, branched, cyclic, comb, star, dendritic and/or modified. Combinations of silane cross-linkers having different molecular structures can be used. One advantageous silane cross-linker is shown in structure 1 wherein the structure has at least two silicon hydride functional groups:

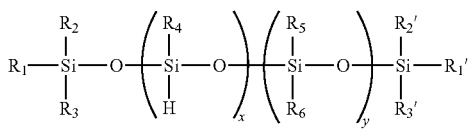

where $R_1$, $R_2$, $R_3$, $R'_1$, $R'_2$, $R'_3$, $R_4$, $R_5$ and $R_6$ are each independently selected from hydrogen; a methyl group; a phenyl group; a substituted hydrocarbon containing one to twenty carbon atoms; an unsubstituted hydrocarbon containing one to twenty carbon atoms. The hydride groups may each independently be terminal or pendent. X is an integer from 1 to 1,000; and y is an integer from 1 to 1000. Advantageously, at least two of $R_1$, $R_1'$, $R_2$, $R_2'$, $R_3$ and $R_3'$ are H. In one cross-linker $R_1$ or $R_1'$ is H and one of $R_2$, $R_2'$, $R_3$ and $R_3'$ is H.

The silicon-hydride crosslinker is present in the elastomeric composition such that the molar ratio of alkenyl groups in the polymer to SiH groups in the silicon-hydride crosslinker is from (0.8 to 1.5):1, more preferably from (0.9 to 1.2):1.

A hydrosilylation catalyst is one that catalyzes the addition of SiH bonds across unsaturated bonds like those found in alkenes or alkynes to form alkyl or alkenyl silanes. Hydrosilylation catalysts typically are platinum based and are well known to those of skill in the art. Useful hydrosilylation catalysts for this reaction include platinum or platinum-containing complexes such as the platinum hydrocarbon complexes described in U.S. Pat. Nos. 3,159,601 and 3,159,662; the platinum alcoholate catalysts described in U.S. Pat. No. 3,220,972, the platinum complexes, described in U.S. Pat. No. 3,814,730 and the platinum chloride-olefin complexes described in U.S. Pat. No. 3,516,946; the contents of each of which are herein incorporated by reference. Each of these patents relating to platinum or platinum-containing catalysts are hereby expressly incorporated herein by reference. Desirably, the platinum or platinum-containing complex is dicarbonyl platinum cyclovinyl complex, platinum cyclovinyl complex, platinum divinyl complex, or combinations thereof. Useful catalysts are available from. Sigma-Aldrich of St. Louis Mo. A common example includes platinum(0)-1,3-divinyl-1,1,3,3-tetramethyldisiloxane complex. As with other elastomeric compositions, preferably the present elastomeric composition is formulated with a low level, of a catalyst inhibitor to prevent the reaction from occurring at room temperature and without the addition of some heating. Hydrosilylation catalyst inhibitors are well known to those of skill in the art and include by way of example only: 3,5-dimethyl-1-hexyn-3-ol.

The elastomer composition according to the present disclosure can also include additional optional components such as stabilizers and antioxidants, plasticizers, additional fillers and handling improvers as known to those of skill in the art. For example, the stabilizer antioxidant can include sterically hindered phenolic compounds such as pentaerythritol tetrakis(3-(3,5-di-tert-butyl-4-hydroxyphenyl)propionate), which is sold under the brand name Irganox® 1010 by BASF. Other fillers include by way of example alumina or carbon black. Plasticizers include a variety of lubricants such as the polyalphaolefin (PAO) lubricants provided under the Synfluid® brand by Chevron Phillips. Specific suitable PAOs include by way of example and not limitation: PAO 9 cSt from Chevron Phillips. Handling improvers include hydrocarbon plasticizers such as Linealene dimer A-20 ($C_{20}H_{40}$) or alkenyl functional monomers. When used, the plasticizers preferably comprise from 1.0 to 15.0 weight % of the elastomeric composition, more preferably from 5 to 12 weight % while the alkenyl functional monomers are preferably used at levels ranging from 0.5 to 20 weight % and more preferably at 1 to 10 weight %.

The heat curable elastomeric compositions according to the present disclosure are formulated and cured as follows. The polymer is mixed with any plasticizer and alkenyl monomers and the silicone hydride crosslinkers. Then all the fillers are mixed with the liquids. Once everything is mixed it is subjected to vacuum and then the hydrosilylation catalyst inhibitor is added. Then the hydrosilylation catalyst is added and the components are thoroughly mixed. The mixed material can then be heat cured to form an elastomeric rubber. The heat curing temperature can be determined by the onset temperature as measured by differential scanning calorimetry (DSC). Preferably the heat curable elastomers according to the present disclosure can be heat cured at a temperature of 100° C. or higher for a period of time sufficient to cross link the composition. Times of from several seconds to several hours or more can be useful depending on the applications.

The heat cured elastomer produced according to the present disclosure has low compression set, high tensile strength, high modulus, high elongation, relatively low viscosity and low moisture and gas permeability. (Compression set of a material refers to the permanent deformation remaining when a force that was applied to the material is removed. The term is normally applied to soft materials like elastomers to measure their sealing ability, the lower the compression set the lower the deformation, and the better their sealing performance. Heat cured elastomeric compositions according to the present disclosure preferably have compression set values of 15% or less when tested at 125° C. for 24 hours and then the compression was released when the elastomer had cooled to: room temperature. The heat cured elastomers according to the present disclosure have tensile strength values above: 300 psi and more preferably 400 psi or greater. The heat cured elastomers according to the present disclosure have a modulus at 100% of from 80 psi to 200 psi and an elongation of greater than 200%. The uncured elastomer according to the present disclosure preferably has a viscosity of from 100 Pa·s to 10,000 Pa·s, more preferably from 200 Pa·s to 800 Pa·s when measured at 25° C. at 12 sec-1 shear rate.

Testing Methods

The viscosity of uncured elastomer samples was measured using Haake, 150 RheoStress at 25° C. at 12 sec-1 shear rate with results reported as Pa·s unless otherwise noted.

Shore A hardness was measured using, the method of ASTM D2240-05.

The tensile strength, modulus and elongation at break, were measured using the method of ASTM D412-98A.

The compression set was measured using the method of ASTM D395 at 125° C. for 24 hours, the samples were allowed to cool to room temperature before being removed.

EXAMPLES

In a first example of the present disclosure an elastomeric composition containing silica filler pre-treated according to the present disclosure, example 1 below, was compared to two comparative elastomeric compositions, examples 2 and 3 below, containing commercially available silica fillers treated only with the hydrophobic compound HMDZ, an ammonia-based compound, wherein two hydrogens have been replaced by trimethylsilyl groups. The commercial comparative silica fillers were obtained from Evonik under the Aerosil® brand and are not treated in accordance with the present disclosure. The silica filler according to the present disclosure was based on fumed silica, Evonik Aerosil® OX 50. The fumed silica can either be heated in-situ or it can be pre-treated with the alkyl silane at a level of from 1 to 5 weight % based on total filler weight and the alkenyl silane at a level of from 0.2 to 2 weight % based on the total weight Both the alkyl and alkenyl silanes are added to the composition at the same time. The compositions are listed in Table 1 below. The compositions were prepared as follows: the polyolefin polymer, lubricant, and stabilizer were mixed, at a temperature of 110° C. for over 2 hours until all of the stabilizer had dissolved in the mixture. The mixture was then cooled to 80° C. The silica fillers and alumina filler were then added and mixed completely. The mixture was subjected to a vacuum to remove air bubbles. The mixture was then cooled, to less than 50° C. and the silicon-hydride crosslinker and catalyst inhibitor were added and the mixture was thoroughly mixed. The mixture was then cooled to below 25° C. and the hydrosilylation catalyst was added and mixed in thoroughly. The compositions were heat cured at 130° C. for 1 hour between two Teflon molds with a thickness of 1 millimeter under a pressure of 200 psi. The stoichiometric ratio of Si—H to alkenyl group is a molar ratio calculated based in total moles of alkenyl groups and Si—H groups and in the examples below some alkenyl group is contributed by the allyltrimethoxy silane.

TABLE 1

| Component | Example 1 wgt % | Comparative Example 2 wgt % | Comparative Example 3 wgt % |
|---|---|---|---|
| Polyolefin polymer with alkenyl functions (EP400A) | 54.14 | 54.14 | 54.14 |
| Lubricant (PAO 9 cSt) | 9.03 | 9.03 | 9.03 |
| Stabilizer (Irganox ® 1010) | 1.83 | 1.83 | 1.83 |
| Pretreated silica filler according to the present disclosure based on OX-50 | 20.00 | 0.00 | 0.00 |
| HMDZ pretreated silica filler (R8200) | 0.00 | 20.00 | 0.00 |
| HMDZ pretreated silica filler (RX50) | 0.00 | 0.00 | 20.00 |
| Alumina filler | 12.97 | 13.22 | 13.22 |
| Silicon-hydride crosslinker poly(dimethylsiloxane-co-methylhydrosilane) | 1.95 | 1.70 | 1.70 |
| Catalyst inhibitor (3, 5-dimethyl-1-hexyn-3-ol) | 0.05 | 0.05 | 0.05 |
| Hydrosilylation catalyst (Platinum(0)-1,3-divinyl-1,1,3,3-tetramethyldisiloxane complex solution) | 0.03 | 0.03 | 0.03 |
| Total | 100.00 | 100.00 | 100.00 |
| Tatio of Si-H: alkenyl in polyolefin | 1.04 | 1.04 | 1.04 |

The heat cured elastomers were then tested as described above for a variety of physical and mechanical parameters. The results of these tests are presented below in Table 2.

TABLE 2

| Property | Example 1 | Comparative Example 2 | Comparative Example 3 |
|---|---|---|---|
| Viscosity at 25° C., 12 sec$^{-1}$ (Pa.s) | 832 | 2,030 | 1,202 |
| Shore A hardness | 32 | 26 | 19 |
| Tensile strength (psi) | 326 | 378 | 340 |
| Modulus at 100% (psi) | 134 | 62 | 53 |
| Elongation at break % | 265 | 367 | 384 |
| Compression set | 2 | 14 | 0 |

All of the physical characteristics of the elastomeric composition have bearing on its usefulness in the desired application. Thus, one must evaluate viscosity, hardness, tensile strength, modulus, elongation and compression set together to evaluate a formulation. The results show the enhanced values for an elastomeric composition, example 1, prepared according to the present disclosure compared to the comparative examples 2 and 3. The viscosity of example 1 is much lower than for the comparative elastomeric compositions, in fact over 2 fold lower than example 2. The viscosity of the comparative examples is too high to make them useful in many applications. The Shore A hardness of the elastomer prepared according to the present disclosure is much higher than that of the comparative compositions. The tensile strength of the elastomer according to the present disclosure is high and similar to that of the comparative elastomers. The modulus at 100% of the elastomer according to the present disclosure is significantly higher than that found in both comparative elastomers. The modulus is more than 2 fold higher in the elastomer prepared according to: the present disclosure versus that found in the comparative compositions. The elastomers have elongations ranging from 265% to 384%. The elastomer according to the present disclosure has a lower elongation at break than the comparative formulations. The compression set of the elastomer according to the present disclosure is also very low at 1%. Overall the elastomer according to the present disclosure has more favorable properties compared to the comparative examples. These include: a low viscosity, a high Shore hardness, the tensile strength and elongation at break is similar across all samples, the modulus is much higher for the elastomer according to the present invention, and the compression set is very low.

In a second example of the present disclosure, an elastomer according to the present disclosure was prepared and tested against a comparative elastomeric composition containing a silica filler treated only with one of the silanes, an alkyl silane. The elastomeric formulations are presented below in Table 3. Example 4 is in accordance with the present disclosure while, example 5, the comparative example, is not. Both elastomer composition silica fillers were treated with the one or more silanes in situ. Example 4 was treated with both an alkyl silane and an alkenyl silane in a weight ratio of 5:1. Example 5 was only treated with an alkyl silane and thus is not in accordance with the present disclosure. The elastomers were prepared as follows. The polyolefin polymer, lubricant and stabilizer were mixed at 110° C. for approximately 2 hours until the stabilizer had fully dissolved. The mixture was then cooled to 80° C. and the alkenyl and alkyl silanes were added as noted to the mixtures. Then the untreated silica filler Was added to the mixture. The mixture was then subjected to vacuum to remove any by products. Next the alumina and carbon fillers were added and mixed in. The mixture was then cooled to 50° C. and the silicon-hydride crosslinker and catalyst Inhibitor were added. Then the mixture was cooled to less than 25° C. and the catalyst was added and mixed in. The examples were cured as described above.

TABLE 3

| Component | Example 4 wgt % | Comparative Example 5 wgt % |
|---|---|---|
| Polyolefin polymer with alkenyl functions (EP400A) | 54.14 | 54.14 |
| Lubricant (PAO 9 cSt) | 9.03 | 9.03 |
| Stabilizer (Irganox ® 1010) | 1.83 | 1.83 |
| Plasticizer (Linealene dimer A-20) | 0.70 | 0.78 |
| Untreated silica filler (OX-50) | 20.00 | 20.00 |
| Alkenyl slime (Allyltrimethoxysilane | 0.25 | 0.00 |
| Alkyl silane (Octyl trimethoxysilane) | 1.25 | 3.00 |
| Alumina | 10.12 | 8.84 |
| Silicon-hydride crosslinker poly(dimethylsiloxane-co-methylhydrosilane) | 2.50 | 2.20 |
| Carbon black | 0.10 | 0.10 |
| Catalyst inhibitor (3, 5-dimethyl-1-hexyn-3-ol) | 0.05 | 0.05 |
| Catalyst (Platinum(0)-1,3-divinyl-1,1,3,3-tetramethyldisiloxane complex solution) | 0.03 | 0.03 |
| Total | 100 | 100 |
| Ratio of Si-H: alkenyl in polyolefin | 1.03 | 1.01 |

Following core the samples were tested for their physical and mechanical properties. The results are presented below in Table 4.

TABLE 4

| Property | Example 4 | Example 5 |
|---|---|---|
| Shore A hardness | 38 | 26 |
| Tensile strength (psi) | 416 | 415 |
| Modulus at 100% (psi) | 140 | 77 |
| Elongation at break % | 248 | 445 |
| Coinpression se | 10 | 19 |

The results show that the dual silane treatment of the silica filler according to the present disclosure is effective even when conducted in situ. The Shore A hardness was higher for the elastomer according to the present disclosure compared to the elastomer not according to the present disclosure. The tensile strengths were the same for both formulations and are sufficiently high. The modulus for the elastomer according to the present disclosure was significantly higher than for the elastomer not according to the present disclosure. The modulus was increased by almost 2 fold. The elongation at break for the present disclosure was lower that for the elastomer not according to the present disclosure. The elastomer according to the present disclosure had a significantly better compression set value than that found in the comparative elastomer not according to the present disclosure. In summary, the overall characteristics for the elastomer according to the present invention were much better than for the comparative example.

The elastomeric compositions according to the present invention also exhibited a much lower oxygen and moisture permeability compared to currently used silicone rubber gasket materials. As shown below in Table 4, the example 4 according to the present invention was compared to a commercial silicone rubber gasket material for oxygen permeability and moisture transmission. The present elastomeric composition was significantly better in that it had a much lower oxygen permeability and moisture transmission rate. The oxygen permeability was tested using a Mocon Oxtran 2/60 with 100% $O_2$ at room temperature and 0% relative humidity. The moisture transmission rate was measured using 1 mm thick cured elastomer or silicone rubber films on a Mocon Permatran W with 100% humidity at 40° C.

TABLE 5

| Parameter | Example 4 | Commercial silicone rubber gasket material |
|---|---|---|
| Oxygen permeability (cc-mil/100 $in^2$/day) | 808 | 9,975 |
| Moisture transmission rate (g/$m^2$/day) | 1.2 | 130 |

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

We claim:

1. A heat curable elastomeric composition comprising:
   a) a modified silica filler comprising silica that has been modified by treatment with at least one alkyl silane having a $C_1$ to $C_{30}$ alkyl group and at least one alkenyl silane having a $C_2$ to $C_{30}$ alkenyl group to form said modified silica filler;
   b) an elastomeric hydrocarbon polymer having a polyolefin backbone and functional alkenyl groups;
   c) a silicon-hydride crosslinker having at least two SiH functional groups;
   d) a hydrosilylation catalyst; and
   e) optionally, one or more of a stabilizer, an anti-oxidant, a plasticizer, an additional filler material, a handling improver, or a hydrosilylation catalyst inhibitor.

2. A heat curable elastomeric composition as recited in claim 1, wherein a weight ratio of the total amount of alkyl silane to the total amount of alkenyl silane is from 1:1 to 10:1.

3. A heat curable elastomeric composition as recited in claim 1, wherein a total combined amount of said alkyl silane and said alkenyl silane in said modified silica filler is from 1 to 15 weight % based on a total weight of said modified silica filler.

4. A heat curable elastomeric composition as recited in claim 1, wherein said modified silica filler is present in an amount of from 10 to 40 weight % based on a total weight of said elastomeric composition.

5. A heat curable elastomeric composition as recited in claim 1, wherein said alkyl silane comprises octadecyl trimethoxysilane and said alkenyl silane comprises allyltrimethoxysilane.

6. A heat curable elastomeric composition as recited in claim 1, wherein said elastomeric hydrocarbon polymer having a polyolefin backbone and functional alkenyl groups comprises terminal alkenyl groups.

7. A heat curable elastomeric composition as recited in claim 6, wherein said elastomeric hydrocarbon polymer having a polyolefin backbone and functional alkenyl groups comprises a polyisobutylene.

8. A heat cured elastomer prepared from:
a) a modified silica filler comprising silica that has been modified by treatment with at least one alkyl silane having a $C_1$ to $C_{30}$ alkyl group and at least one alkenyl silane having a $C_2$ to $C_{30}$ alkenyl group to form said modified silica filler;
b) an elastomeric hydrocarbon polymer having a polyolefin backbone and functional alkenyl groups;
c) a silicon-hydride crosslinker having at least two SiH functional groups;
d) a hydrosilylation catalyst; and
e) optionally, one or more of a stabilizer, an anti-oxidant, a plasticizer, an additional filler material, a handling improver, or a hydrosilylation catalyst inhibitor.

9. A heat cured elastomer as recited in claim 8, wherein a weight ratio of the total amount of alkyl silane to total amount of alkenyl silane is from 1:1 to 10:1.

10. A heat cured elastomer as recited in claim 8, wherein a total combined amount of said alkyl silane and said alkenyl silane in said modified silica filler is from 1 to 15 weight % based on a total weight of said modified silica filler.

11. A heat cured elastomer as recited in claim 8, wherein said modified silica filler is present in an amount of from 10 to 40 weight % based on a total weight of said elastomer.

12. A heat cured elastomer as recited in claim 8, wherein said alkyl silane comprises octadecyl trimethoxysilane and said alkenyl silane comprises allyltrimethoxysilane.

13. A heat cured elastomer as recited in claim 8, wherein said elastomeric hydrocarbon polymer having a polyolefin backbone and functional alkenyl groups comprises terminal alkenyl groups.

14. A heat cured elastomer as recited in claim 13, wherein said elastomeric hydrocarbon polymer having a polyolefin backbone and functional alkenyl groups comprises a polyisobutylene.

15. A heat cured elastomer as recited in claim 8, wherein said elastomer has a compression set after 24 hours at 125° C. of less than 15%.

16. A heat cured elastomer as recited in claim 8, wherein said elastomer has a tensile strength of greater than 300 psi.

17. A heat cured elastomer as recited in claim 8, wherein said elastomer has a modulus at 100% of from 80 to 200 psi, and an elongation at break of greater than 200%.

18. A modified silica filler material comprising a silica filler material that has been modified by treatment with at least one alkyl silane having a $C_1$ to $C_{30}$ alkyl group and at least one alkenyl silane having a $C_2$ to $C_{30}$ alkenyl group, wherein a weight ratio of said alkyl silane to said alkenyl silane is from 1:1 to 10:1.

19. A modified silica filler material as recited in claim 18, wherein a total combined amount of said alkyl silane and said alkenyl silane in said modified silica filler is from 1 to 15 weight % based on a total weight of said modified silica filler.

20. A modified silica filler material as recited in claim 18, wherein said alkyl silane comprises octadecyl trimethoxysilane and said alkenyl silane comprises allyltrimethoxysilane.

* * * * *

UNITED STATES PATENT AND TRADEMARK OFFICE
CERTIFICATE OF CORRECTION

PATENT NO. : 11,118,029 B2
APPLICATION NO. : 16/034406
DATED : September 14, 2021
INVENTOR(S) : DeCato et al.

It is certified that error appears in the above-identified patent and that said Letters Patent is hereby corrected as shown below:

In the Specification

Column 8, Line 39 change "cooled to: room temperature" to --cooled to room temperature--.

Column 8, Line 41 change "values above: 300 psi" to --values above 300 psi--.

Column 9, Line 16 change "weight Both" to --weight. Both--.

Column 11, Line 44 change "Compression se" to --Compression set--.

Signed and Sealed this
Third Day of May, 2022

Katherine Kelly Vidal
*Director of the United States Patent and Trademark Office*